Patented Aug. 1, 1939

2,168,169

UNITED STATES PATENT OFFICE 2,168,169

PROCESS OF TREATING PHOSPHATIC ORES

Oskar Meyer, Bitterfeld, Germany, assignor to I. G. Farbenindustrie Aktiengesellschaft, Frankfort-on-the-Main, Germany No Drawing. Application November 27, 1936, Serial No. 112,992. In Germany December 5, 1935

4 Claims. (Cl. 23—22)

The present invention relates to improvements of phosphatic materials, and more particularly to improvements in the treatment, with a view to recovering metals and compounds other than phosphates, of ores, slags and similar materials in which phosphates occur in minor proportions.

In the treatment of ores, slags and like materials by roasting, or oxidising smelting, followed by leaching and treatment of the liquors and leaching residues, in the usual manner employed for the recovery of various substances from ores, the resulting liquors, in the case of phosphatic originating materials, also contain a proportion of the phosphates concerned, owing to the solubility of these latter. In general, it is therefore necessary to separate the phosphates, by troublesome and expensive processes, before further treating the liquors.

The present invention aims at converting the phosphates contained in the raw materials under treatment, into a practically insoluble form, prior to the leaching operation, and preferably during the roasting process, thereby obviating their entry into the liquors, so that the latter can be worked up direct into the desired end products.

Based on the known fact that phosphoric acid forms double compounds with oxides of the alkaline earths and certain halogens, more particularly fluorine, it has been ascertained that these compounds are substantially less soluble in a number of solvents than is the case with the heavy-metal, or alkaline-earth phosphates, of the usual or of diverse compositions obtained from ores, slags and like materials by the hitherto customary methods. This reduced solubility is exhibited by both basic and acid phosphatic substances, and not only in relation to water and neutral solvents, but also towards weakly acid and alkaline solutions.

According to the present invention, therefore, phosphatic ores, slags and like materials are subjected to roasting, or preliminary smelting under strongly oxidising conditions, with addition of fluorides and, so far as is necessary, alkaline earth metal oxides forming sparingly soluble double salts with the phosphoric acid present, the roasted or smelted material being then leached with neutral, weakly basic or weakly acid agents. In this manner, solutions are obtained which are either entirely free from phosphates, or contain substantially smaller amounts of phosphates than heretofore.

The simplest method of mixing the substances added in accordance with the present invention, with the originating material is by grinding the mixture, although said substances may also be melted down together with the originating material. The upper limit of the temperature to be applied in a roasting process carried out in accordance with the invention is determined by the consideration that extensive balling of the charge material, through sintering, should be prevented. Temperatures between about 600° and 1000° C. depending on the nature of the originating material under treatment, have been found advantageous.

The strongly oxidising conditions required for the extensive formation of the foregoing double salts may be brought about either by employing a considerable excess of air during the process, or by the addition of known substances—such as alkali metal nitrates or chlorates—which liberate or transmit oxygen. In all probability, the phosphate radicle combined with the metallic oxides, is thereby liberated and said oxides are raised to a higher stage of oxidation, the metallic phosphate being therefore decomposed, so that the phosphate radicle reacts, rapidly and completely, with the alkaline-earth oxide and the fluoride, the desired double salt being formed.

Example 1

A pig iron slag, containing phosphates and vanadates, and having the composition:

| | Percent |
|---|---|
| $V_2O_5$ | 4.25 |
| FeO | 20.0 |
| MnO | 30.0 |
| CaO | 1.5 |
| $SiO_2$ | 20.0 |
| $P_2O_5$ | 8.5 | the remainder being $Al_2O_3$ and MgO, after the admixture of 20% of sodium chloride, was subjected to oxidation-chlorination roasting for 2 hours at 800° C. The subsequent leaching with a 5% solution of sodium carbonate, at 80° C., furnished a liquor containing 0.96 grm. of $P_2O_5$ per litre, in addition to 5.5 grms. of $V_2O_5$ per litre.

However, when 1% of fluorspar and about 7% of burnt lime were first added to the foregoing slag in accordance with the present invention, the mixture being then treated under the same conditions, the resulting liquor contained only 0.055 grm. of $P_2O_5$ per litre, in addition to 4.6 grms. of $V_2O_5$ per litre. Thus, the ratio of $V_2O_5$ to $P_2O_5$ has been increased over seventeen-fold by the process of the present invention. Whereas, in the case of the ordinary process, the further working up of the liquor to technically pure vanadic acid or vanadates, entailed the inclusion of another working stage for the separation of the phosphate, it is possible, for example, to recover from the liquors obtained in accordance with the present invention, a vanadic acid containing less than 0.1% of phosphorus and suitable for the production of high-grade ferrovanadium or other products containing vanadium.

*Example 2*

The treatment of a uranium ore, containing 2% of uranium and 0.6% of $P_2O_5$, by roasting for two hours at 850° C. without addition of lime and fluorspar, the product being then leached with a 5% solution of sodium carbonate at 80° C. furnished liquors with a content of 0.09 grm. of $P_2O_5$ per litre.

However, when the roasting was preceded by an addition of an amount of lime corresponding to the phosphate content of the ore, 1% of fluorspar being added at the same time, the resulting liquor contained only about 0.01 grm. of $P_2O_5$ per litre. Thus, in this case also, the ratio of $UO_3$ to $P_2O_5$ was substantially improved.

I claim:

1. A process of treating pig iron slags containing phosphates and vanadates, which comprises admixing with said comminuted slag calcium fluoride and calcium oxide both in proportions adapted to cause the formation, with the phosphoric acid radicles present, of a sparingly soluble double salt of hydrofluoric acid and phosphoric acid, roasting such mixture under conditions ensuring the conversion of the vanadium compounds into $V_2O_5$, subsequently lixiviating such roasted mixture with the aid of a from weakly acid to weakly basic solution adapted to dissolve the metal values without dissolving the phosphate compound formed, and recovering vanadium compounds from the liquor thus obtained.

2. A process of treating pig iron slags containing phosphates and vanadates, which comprises admixing with said comminuted slag calcium fluoride and calcium oxide both in proportions adapted to cause the formation, with the phosphoric acid radicles present, of a sparingly soluble double salt of hydrofluoric acid and phosphoric acid, and further at least one compound promoting the conversion of the vanadium compounds present into $V_2O_5$ at roasting temperatures, roasting and subsequently lixiviating such mixture with the aid of a from weakly basic to weakly acid solution adapted to dissolve the metal values without dissolving the phosphate compound formed, and recovering vanadium compounds from the liquor thus obtained.

3. A process of treating pig iron slags containing phosphates and vanadates, which comprises admixing with said comminuted slag calcium fluoride and calcium oxide both in proportions adapted to cause the formation, with the phosphoric acid radicles present, of a sparingly soluble double salt of hydrofluoric acid and phosphoric acid, and further at least one compound of the group consisting of alkali metal nitrates and chlorates in proportions adapted to ensure the conversion of the vanadium compounds into $V_2O_5$ at roasting temperatures, roasting and subsequently lixiviating such mixture with the aid of a from weakly basic to weakly acid solution adapted to dissolve the metal values without dissolving the phosphate compound formed, and recovering vanadium compounds from the liquor thus obtained.

4. A process of treating pig iron slags containing phosphates and vanadates, which comprises admixing with said comminuted slag calcium fluoride and calcium oxide both in proportions adapted to cause the formation, with the phosphoric acid radicles present, of a sparingly soluble double salt of hydrofluoric acid and phosphoric acid, and further at least one compound of the group consisting of alkali metal nitrates and chlorates in proportions adapted to ensure the conversion of the vanadium compounds into $V_2O_5$ at roasting temperatures, roasting and subsequently lixiviating such mixture with a weak sodium carbonate solution at elevated temperatures, and recovering vanadium compounds from the liquor thus obtained.

OSKAR MEYER.